(12) United States Patent
Mandalia

(10) Patent No.: US 6,507,647 B1
(45) Date of Patent: Jan. 14, 2003

(54) BULK CALLING USING VOICE OVER IP TELEPHONY

(75) Inventor: Baiju D. Mandalia, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/275,759

(22) Filed: Mar. 25, 1999

(51) Int. Cl.⁷ .......................... H04M 7/00; H04M 3/00; H04L 12/66
(52) U.S. Cl. .................... 379/219; 379/265.02; 370/352
(58) Field of Search ............................ 379/219, 220.01, 379/221.01–221.15, 229, 230, 265.02, 265.04, 265.11, 308, 309; 370/352, 493, 494, 495

(56) References Cited

U.S. PATENT DOCUMENTS

| | | | | |
|---|---|---|---|---|
| 6,084,892 A | * | 7/2000 | Benash et al. | 370/701 |
| 6,097,719 A | * | 8/2000 | Benash et al. | 370/352 |
| 6,161,008 A | * | 12/2000 | Lee et al. | 455/414 |
| 6,170,011 B1 | * | 1/2001 | Macleod Beck et al. | 379/265.01 |
| 6,201,804 B1 | * | 3/2001 | Kikinis | 370/352 |
| 6,389,007 B1 | * | 5/2002 | Shenkman et al. | 370/352 |

FOREIGN PATENT DOCUMENTS

WO    WO 98/30008    * 7/1998    ............ H04M/7/00

* cited by examiner

Primary Examiner—Benny Q. Tieu
(74) Attorney, Agent, or Firm—Michael J. Buchenhorner; Fleit, Kain, Gibbons, Gutman & Bongini P.L.; Jon A. Gibbons

(57) ABSTRACT

A system for providing bulk calling over a public switched telephone network (PSTN) comprising: an Internet Protocol (IP) telephony gateway for receiving at least one PSTN line; a database connected to the gateway for providing telephone customer information; one or more client information processing units, each unit capable of being linked to at least one IP telephone; and local area network connecting each of the client information processing units with the gateway. In accordance with another embodiment of the present invention, a method and computer readable storage medium that corresponds to the above system.

19 Claims, 6 Drawing Sheets

US 6,507,647 B1

BULK CALLING USING VOICE OVER IP TELEPHONY

CROSS-REFERENCE TO RELATED APPLICATIONS

Not applicable

BACKGROUND OF THE INVENTION

1. Field of the Invention

The invention disclosed broadly relates to the field of telephony, and more particularly relates to the field of automated bulk calling over telephones for collection agencies, tele-marketing, telephone surveys and other similar applications.

2. Description of the Related Art

The use of automated bulk calling via telephony has been around for awhile. Telephone solicitors, telephone surveys and others have been making use of computer databases containing phone numbers to target sales, surveys and other requirements. The computer databases typically contain telephone numbers, names, addresses and other information found in a telephone book. These database can be optimized to certain market demographics, for example, to people in a region that normally receives snow and optimized for regions based on social economic data, such as, people who donate money to charitable organizations.

FIG. 1 illustrates a functional block diagram of a typical telephone network for bulk calling using analog phone lines to a Public Switch Telephone Network (PSTN). Several customer telephones 102, are coupled to the PSTN 104. A plurality of operator stations 110 with a database 108 connected to a network 106 is shown. The next telephone number to be dialed from the database 108 is displayed on the appropriate operator station 110. At each operator station 110, an operator telephone 112 is connected to the PSTN 104. The connection between the operator telephone 112 to the PSTN 104 is over analog lines 114. An operator sitting at a station 110 uses the operator telephone 112 connected to the PSTN 104, to dial the next number in the database. In some embodiments, the number in the database is automatically dialed from the database 108 for the operator sitting at the operator station 110. While this architecture for providing bulk calling services is useful, it is not without its shortcomings.

One shortcoming in the typical telephone network for bulk calling is that the telephone 112 at each operator station 110 must be directly coupled to the PSTN 104. This requirement that each telephone 112 at the operator station 110 can be expensive because a separate analog line must be coupled to the PSTN 104. Accordingly, a need exists to provide a bulk calling system that eliminates the requirement that the telephone at each operator station be directly connected to a PSTN.

Another shortcoming in the typical telephone network for bulk calling is the ability to handle telephone customers whose lines are busy or not available. Typically, the operator sitting at the operator station 110 must manually update the database 108 when a call to the customer telephones 102 does not complete. This method of marking the database 108 that the call was not complete can be cumbersome and is prone to operator errors. Moreover, many times, the operator does not know immediately if the called telephone subscriber at a particular location has subscribed to additional services or supplementary services, such as "Find Me" or "Call Forwarding" service and must wait for a delay or signal over the PSTN 104 to indicate such a service is invoked. Many bulk solicitors do not want to speak with a party with additional services running and would rather speak with the potential telephone customer at their home numbers. The ability to determine if additional services are running for a telephone subscriber is not always possible over direct analog connections to the PSTN 104 without other intelligent devices for sensing that the called party is running a subscriber service. One method to handle the cases where a telephone subscriber may not be available is to have each operator station 110 include additional hardware and software such as an application using the Microsoft TAPI (Telephony API) and corresponding hardware to dial a number from the database 108. The hardware could log the status backed to the database 108 if a successful call has completed. This method although effective, can be expensive because each operator station 110 not only needs to have an analog connection 114 to the PSTN 104 but must have the speciality hardware and software inside each operator unit as well. Therefore, a need exists for a bulk calling architecture to overcome these limitations.

SUMMARY OF THE INVENTION

Briefly, in accordance with the present invention, a system for providing bulk calling over a public switched telephone network (PSTN) comprising: an Internet Protocol (IP) telephony gateway for receiving at least one PSTN line; a database connected to the gateway for providing telephone customer information; one or more client information processing units, each unit capable of being linked to at least one IP telephone; and a local area network connecting each of the client information processing units with the gateway. In accordance with another embodiment of the present invention, a method and computer readable storage medium that corresponds to the above system.

DETAILED DESCRIPTION OF AN EMBODIMENT

Figure 1:
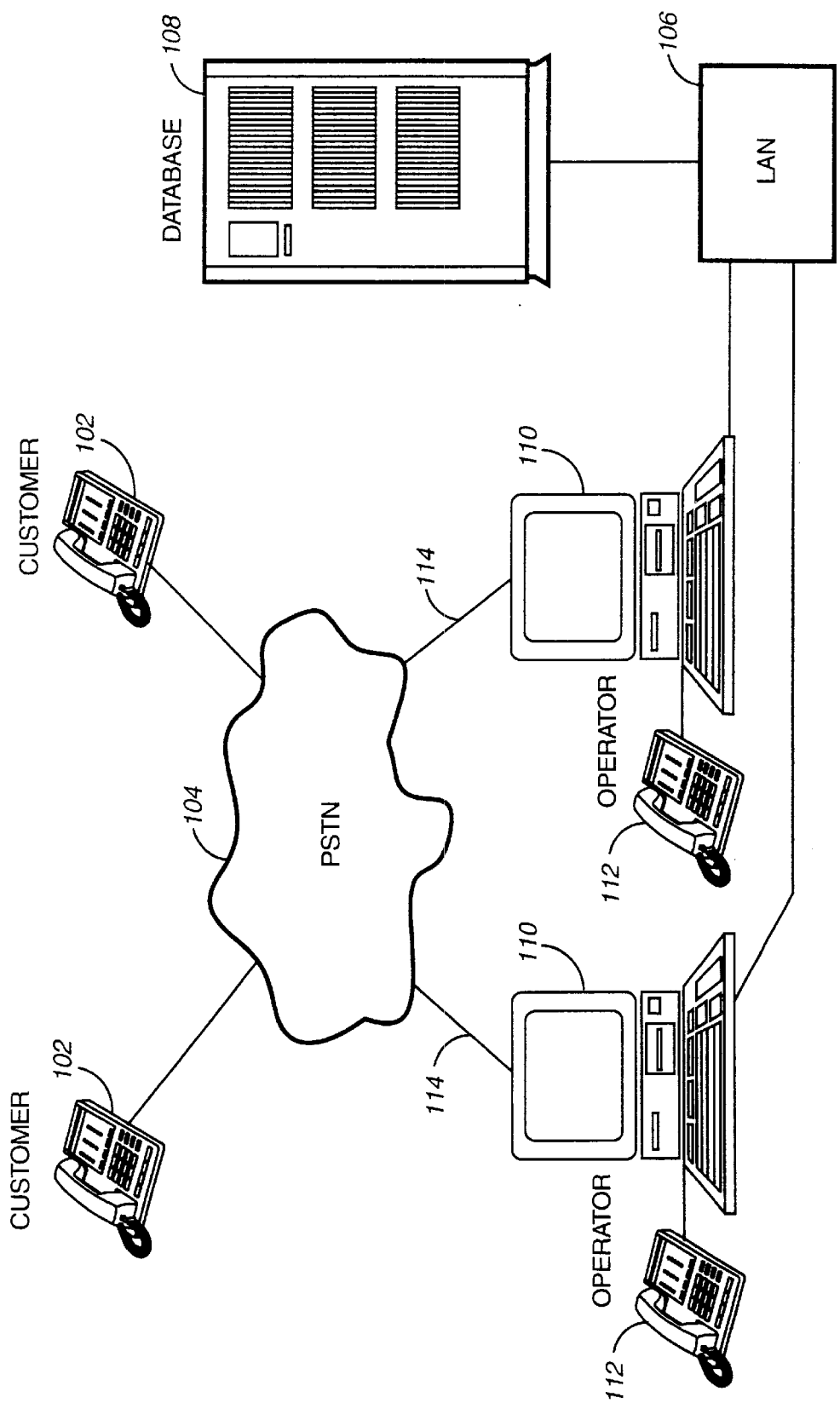
FIG. 1 is a functional block diagram of a telephone network for bulk calling using analog phone lines to a Public Switch Telephone Network (PSTN).
Figure 2:
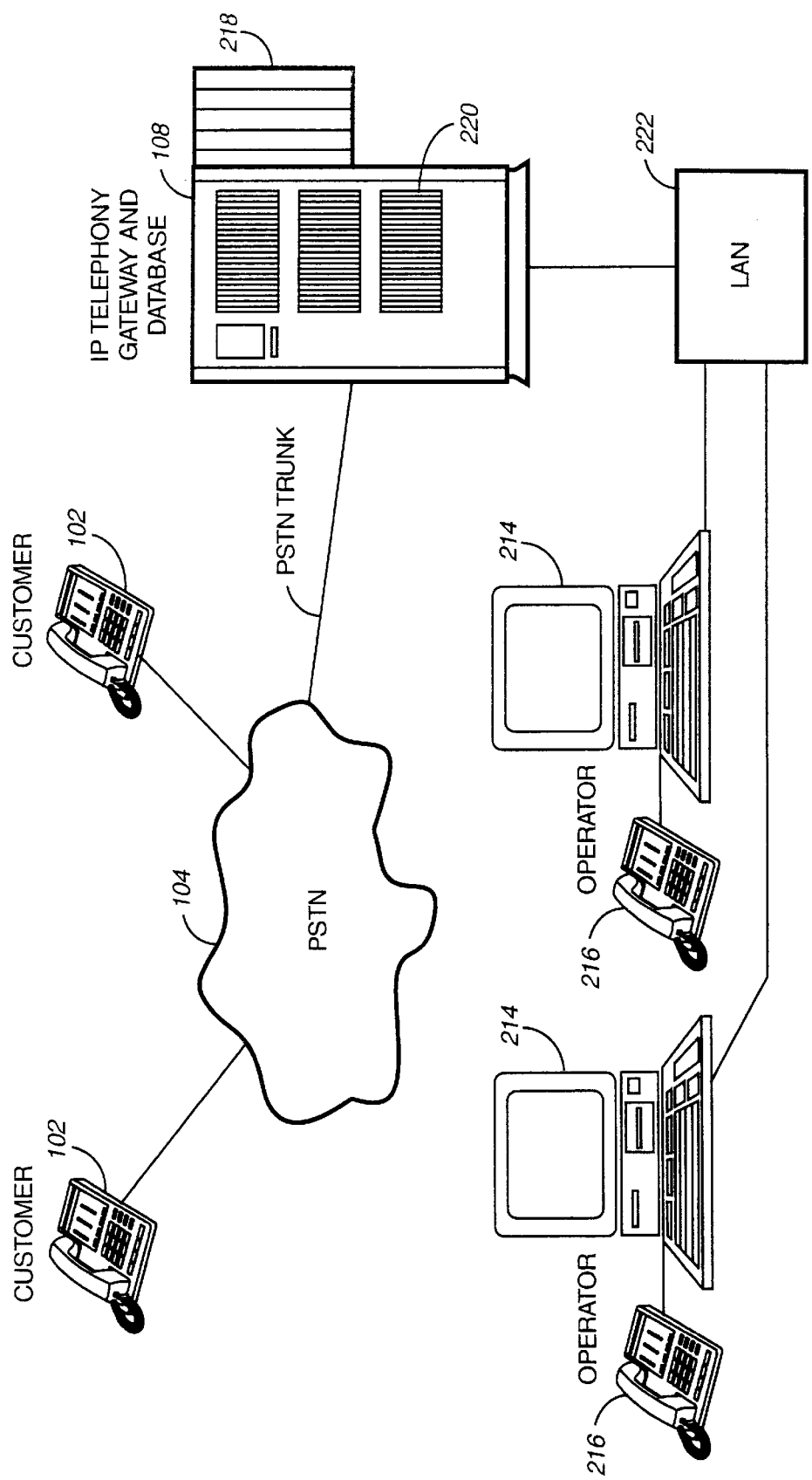
FIG. 2 is a functional block diagram of a telephone network for bulk calling using Internet Protocol Telephony.Gateway according to the invention.
Figure 3:
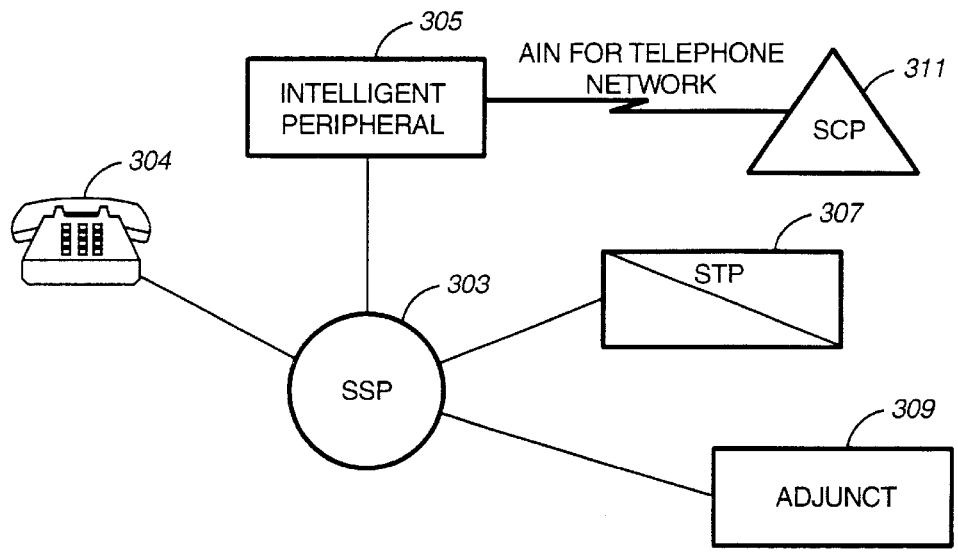
FIG. 3 is a block diagram of an Internet Protocol Telephony Gateway of FIG. 2 using AIN architecture implementation.

Referring now in more detail to the drawings in which like numerals refer to like parts throughout several views, FIG. 2 illustrates a functional block diagram of a telephone network for bulk calling using Internet Protocol Telephony Gateway according to the invention. A plurality of customer telephones 102 are connected to the PSTN 104. The PSTN is linked to an Internet Protocol (IP) telephony gateway 218 with a database 220 for holding telephone customer information. The database 220 can hold the telephone numbers, names, addresses and other information about a telephone customer. The IP telephony gateway 218 is a standard H.323 Gateway. The H.323 Gateway is an optional element in an H.323 conference. The H.323 Gateway provide many services, the most common being a translation function between H.323 conferencing endpoints and other terminal types. This function includes translation between transmission formats (i.e. H.225.0 to H.221) and between communications procedures (i.e. H.245 to H.242). In addition, the H.323 Gateway also translates between audio and video codecs and performs call setup and clearing on both the LAN side and the switched-circuit network side. More information on the H.323 Gateway is available from DataBeam Corporation of Kentucky at online URL http://www.databeam.com/h323/h323primer.html. Continuing on, an IP network 222 is linked to the IP telephony gateway 218. One or more operator information processing systems 214 are coupled to the IP network 222. Each operator information processing system 214 is described in greater detail in FIG. 5 below. An IP telephone 216 is connected to each operator information processing system. The IP telephone can be the telephones supplied with Microsoft's NetMeeting client package or equivalent. In another embodiment, the IP telephone is an analog telephone with a conversion box, such as the Hi-Phone brand available from Shelcad for connecting to the operator information processing systems 214. The IP network 222 is any LAN or other network capable of running an IP protocol Turning now to FIG. 3, shown is a block diagram of an IP gateway of FIG. 2 using an AIN architecture implementation. Further information about AIN architecture can be obtained by referring to one or more of the following published documents, whose teachings are incorporated herein by reference.

Bellcore, GR-2802-CORE, Advanced Intelligent Network (AIN) 0.X Issue 1, Generic Requirements, Issue 2, December 1993.

Bellcore, GR-1129-CORE, Advanced Intelligent Network (AIN) 0.2 switch Intelligent Peripheral Interface (IPI) Generic Requirements, ILC 1E, November 1994.

ISC-IP Interface Specification, Bellcore, SR-3511.

The AIN system 300 is associated with a regional node of the PSTN. A telephone unit 301, available to a "local" PSTN user, links to the regional node through a signal switch points (SSP) complex 303. The SSP 303 connects to an intelligent peripheral system 305, a hierarchical network of signaling transfer points (STPs) 303, and an adjunct system 309.

The Intelligent Peripheral 305 provides switched connections for telephone calls passing through the respective regional node (e.g., between local and trunk lines traversing the node), and controls service applications associated with respective calls (conferencing, voice announcements, speech recognition applications, call forwarding, etc.). The SSP 303 supports communications between telephones such as the customer telephones 102 and the Intelligent Peripheral 305 using ISDN (Integrated Services Digital Network) connections, SS7 ISUP (ISDN User Part) or similar connections.

The SSP 303 communicates through the STPs with a service control point (SCP) 311, using a known signaling system and the SS7 packet-switched message format. The Intelligent Peripheral 305 and SCP 311 coordinate service logic functions (e.g. functions required to play voice announcements) using a known "1129+" signaling protocol.

Call connections between local telephones such as the customer telephones 102 and other local telephones are formed by operations of the Intelligent Peripheral 305 and the SSP 303. Connections between local telephone 301 and remote telephones associated with remote SSPs and IPs are formed by transmission of call setup messages between SSP 303 and the remote SSPs via STP 307 (and other STPs if appropriate) as well as SCP 311 (and remote SCPs if appropriate). Upon determining that a path exists for a required remote call connection, SSP 303 and the other SSPs cooperate with respective IPs to establish the connection.

Message communications, between SSP's such as SSP 303 and both respective IPs such as Intelligent Peripheral 305 and associated SCPs such as SCP 311, are required to set up call connections and administer telephone user services associated with respective calls. Such message communications are conducted through a common channel signaling (CCS) network formed between the SSPs, the STPs, and the SCPs using the aforementioned SS7 packet switched signaling protocol. The SS7 protocol is used as a network transport layer to facilitate message communication within the CCS network. A regional CCS network, encompassing a region containing the local switching office nearest to the telephone 301 and other switching offices, contains a hierarchy of STPs associated with a hierarchy of SCPs. Each SSP, at local levels nearest to individual user telephones such as 301, connects to two SSPs associated with the respective level. This redundancy is useful to produce high reliability.

Message communications between IPs such as 305 and SCPs such as 111 are conducted in the previously mentioned "SR-3511" signaling protocol. That protocol enables service logic running on the SCPs to coordinate actions with service logic running on the IPs during delivery of telephone services to telephones such as the customer telephones 102.

The SSPs are program-controlled telephone switching systems (either access tandem switches or end officers) without local networks connecting to user telephones in a local sub-region. They form local interfaces to the aforementioned CCS network.

The SCPs are stand-alone network systems which, in existing intelligent telephony control networks, have been primary focal points for administration of services provided to PSTN users. An SCP can contain service logic and online, real-time database systems. An SCP provides call processing information and instructions in response to queries received through the CCS network.

The SCPs support multiple applications, each containing logic defining the handling of individuals calls. After determining actions to be performed in response to a specific query, the SCP sends instructions for handling the respective call back to the SSP that initiated the inquiry. Different services/applications may be offered at different SCPs.

The adjuncts 309 are also stand-alone network systems. They are functionally equivalent to SCPs, but each communicates directly with only one locally associated SSP (whereas SCPs can communicate with multiple SSPs, both within and external to a local region or sub-region). In operation, such adjunct networks enable the development and delivery of telephony services which are not totally reliant on SSPs and SCPs for implementation.

It is important to understand that the present invention is not limited to AIN network implementations currently in use in North America and described herein. Many other telephony Intelligent Network implementations are used throughout the world. These other Intelligent Network standards may included other signaling standards and network protocols. Therefore it should be understood that the other Intelligent Network implementations are contemplated and come within the true scope and spirit of this present invention.

Two embodiments for implementation of bulk calling using voice over IP telephony in this invention. In one implementation the AIN system 300 is external to PSTN 104 and in the other implementation the AIN system 300 is internal to the PSTN 104. In the first embodiment where the AIN system 300 is external to PSTN 104, the signaling from end-point to end-point will be all digital using the capabilities of ISDN standard. A connection is made from a customer telephone 102 to a PSTN 104 trunk on the IP telephony gateway 218. The ISDN standard allows for information relative to devices connected to it to be registered in the PSTN 104. The operator information processing system 214 for bulk calling uses H.323 signaling which is based on the ITU Q.931 standard used by ISDN trunks which are use in the PSTN 104 today. In this scenario, whenever devices are busy or flagged for forwarding, this information can be relayed to the calling operator information processing system 214 for appropriate action on the call. The speed of ISDN allows for much faster connections and disconnections. The time for call-up setup over analog PSTN 104 systems can be 1 to 4 seconds. Contrasted with the call setup over digital PSTN 104 systems where the call progress can sub-second response time. The more digital equipment used in the PSTN 104, the faster the connections and it should be understood to those skilled in the art that faster setup times is one of the advantages in the present invention over bulk calling systems using analog. In addition, while the ITU Q.931 standards have defined capabilities of ISDN, not all switches and user equipment of PSTN 104 implement all functions as described in this standard. As the ISDN evolves, many additional functions in the standard will be available and the performance benefits of this present invention will be more even more notable to those skilled in the art.

In the second embodiment, where the AIN system 300 is internal to PSTN 104, all aspects described above for the first embodiment are included. The IP telephony gateway 218 using AIN architecture as an adjunct to the SCP inside the PSTN 104. In addition, the signaling information is controllable from within the PSTN 104. The example being that newer features that are not in the standard can be enabled like call back on busy or differentiating between fax, answering machines and a live person by fax detection or prompting for DTMF (Dual Tone Multiple Frequency) key selection on customer telephones 102. In this implementation, the PSTN 104 line to customers telephones 102 can be free and not have to be tied up while PSTN 104 tries to use it's own internal resources to automate the calls. In other words, the IP telephony gateway 218 can interrogate the customer telephone 102 with out tieing up the ports to the PSTN 104 via the IP telephony gateway 218 that the provider of bulk services may be using for placing calls via the operator information processing systems 214.

Figure 4:
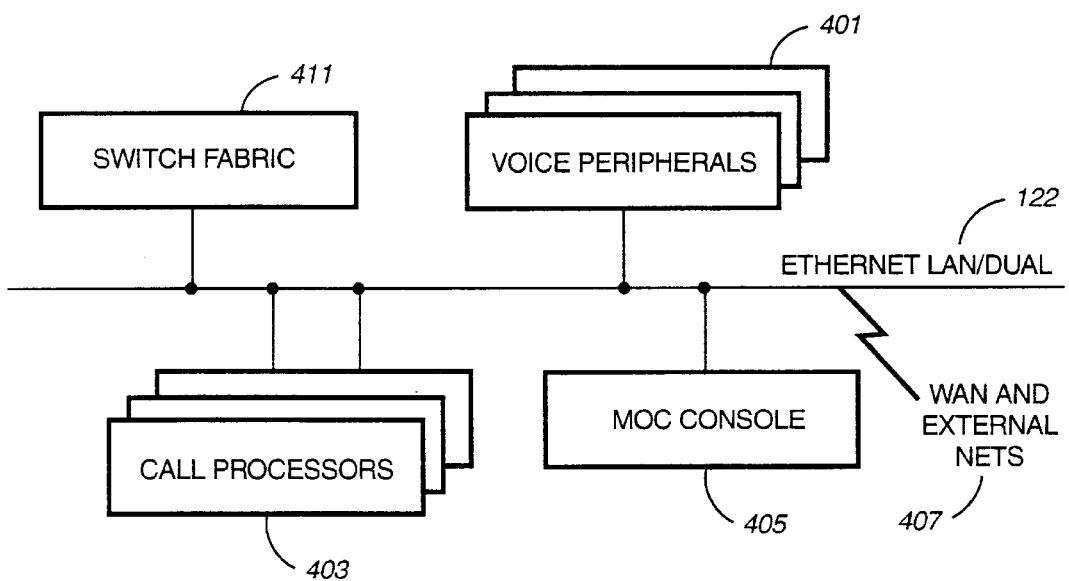
FIG. 4 is a block diagram of the principle components of the Intelligent Peripheral system of FIG. 2 according to the invention.

FIG. 4 shows the principal components 400 of the Intelligent Peripheral system 305 of FIG. 3. The Intelligent Peripheral system 305 is based upon an IBM MSP/6000 or an MSP for AIX system. Standard elements of an MSP/6000 system include a "switch fabric" complex 411, voice peripherals 401, call processors 403, a maintenance and operations console (MOC) processor 405 are all attached via communications links external Ethernet/LAN 222 and WAN and external nets 407. Critical components including voice peripheral processors 401 and call processors 403 are configured redundantly to ensure continuous availability in case of any component failure. Further information on the IBM MSP/6000 system can be found in the patent application entitled "Multi-processor systems used as an AIN system" application Ser. No. 08/792,018 by Deborah L. Acker and Thomas E. Creamer and assigned to International Business Machines (IBM) and is incorporated herein by reference. Customize telephony services running on MSP/6000 include detailed billing, call forwarding, call waiting, voice announcements, voice response, keyboard response, debit card call, detailed billing, and peak/off peak charges.

Figure 5:
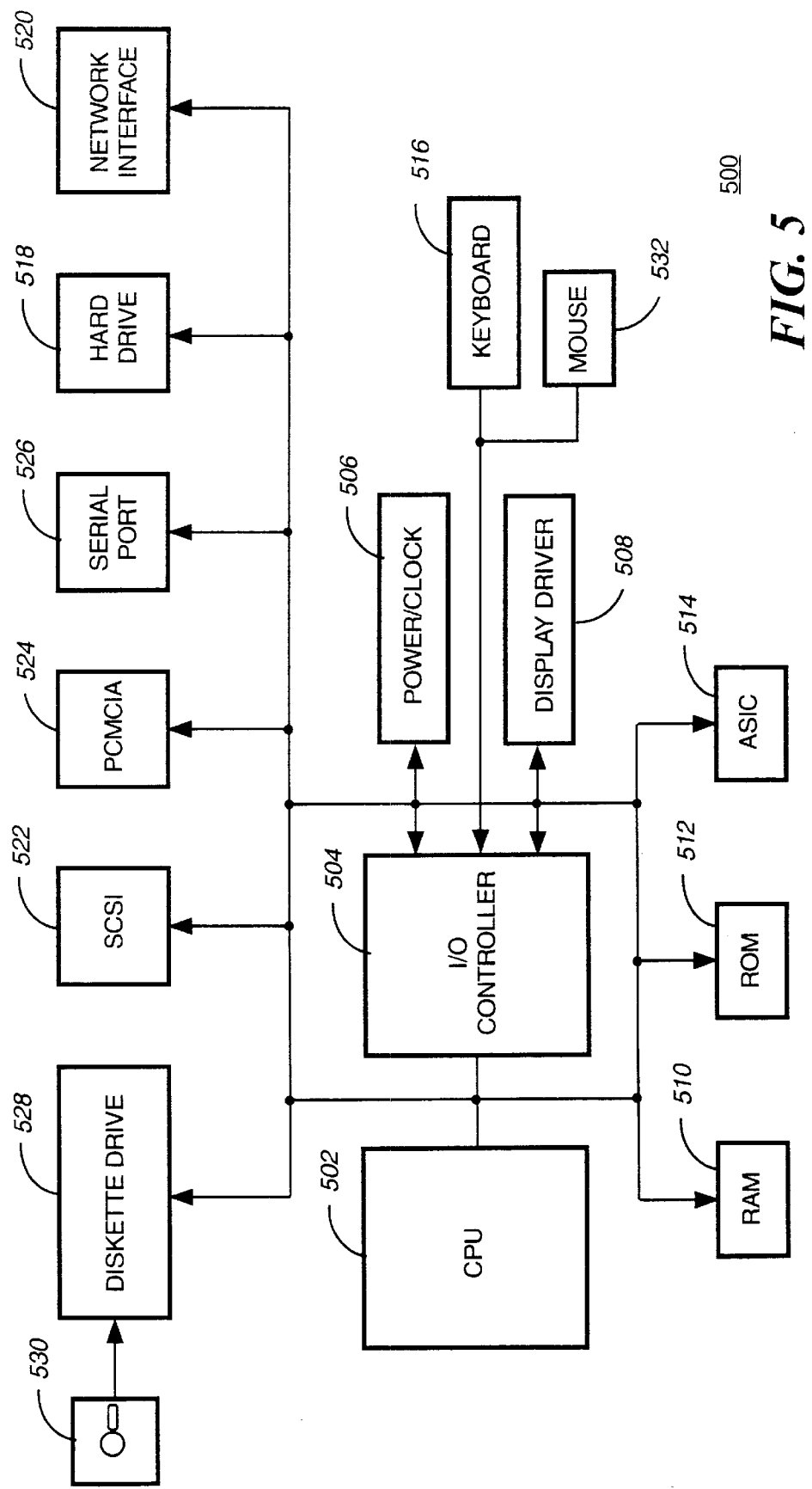
FIG. 5 is a block diagram of the major electrical components of an information processing system for an operator station of FIG. 2 according to the present invention.

Referring to FIG. 5, there is shown a block diagram of the major electrical components 500 of an operator station 214 of FIG. 2 accordance with this invention. The electrical components include: a central processing unit (CPU) 502, an Input/Output (I/O) Controller 504, a system power and clock source 506; display driver 508; RAM 510; ROM 512; ASIC (application specific integrated circuit) 514 and a hard disk drive 518. A keyboard 516 with a mouse 532 receives the user input. These are representative components of a computer. The operation of a computer comprising these elements is well understood. Network interface 520 provides connection to a computer network such as Ethernet, TCP/IP or other popular protocol network interfaces. Optional components for interfacing to external peripherals include: a Small Computer Systems Interface (SCSI) port 522 for attaching peripherals; a PCMCIA slot 524; and serial port 526. An optional diskette drive 528 is shown for loading or saving code to removable diskettes 530. The system 500 may be implemented by combination of hardware and software. Moreover, the functionality required for using the invention may be embodied in computer-readable media (such as 3.5 inch diskette 530) to be used in programming an information-processing apparatus (e.g., a personal computer) to perform in accordance with the invention.

Figure 6:
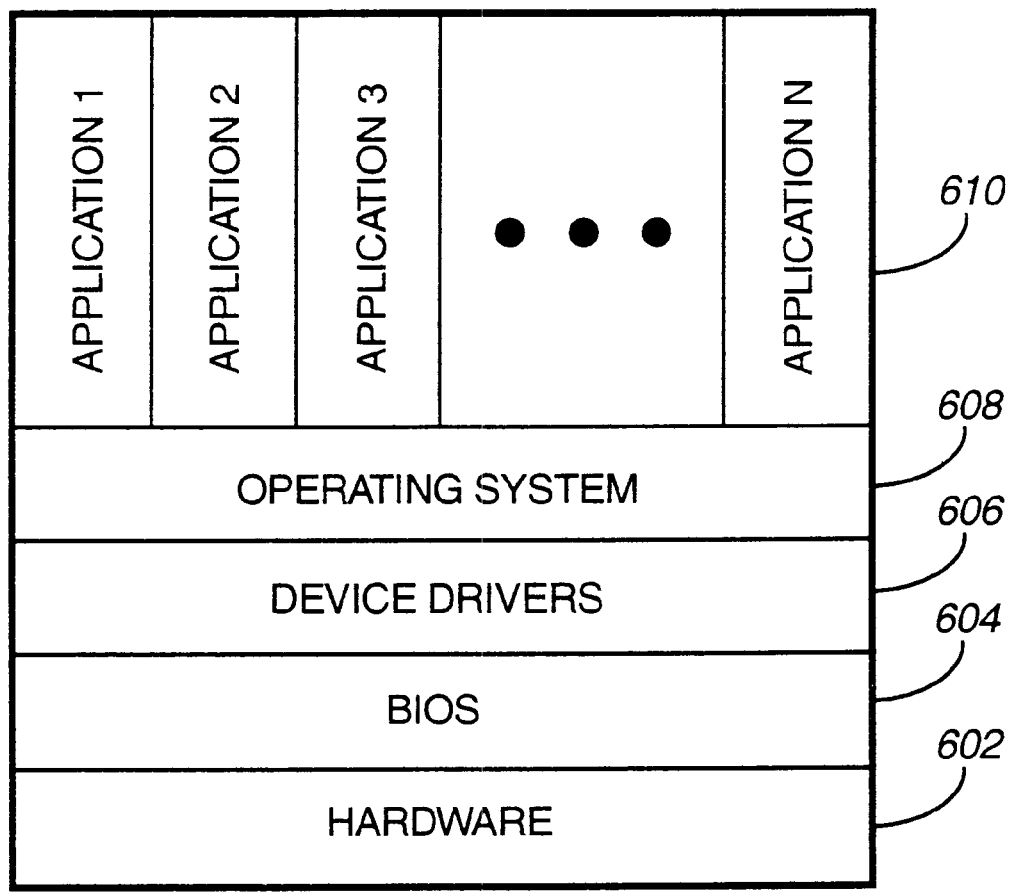
FIG. 6 is a block diagram illustrating the software hierarchy for the information processing device of FIG. 5 according to the present invention.

FIG. 6 is a block diagram illustrating the software hierarchy for the information processing device of FIG. 5 according to the present invention. The hardware 602 is the information processing system of FIG. 5. BIOS (Basic Input Output System) 604 is a set of low level of computer hardware instructions, usually stored in ROM 512, for communications between an operating system 608, device driver(s) 606 and hardware 602. Device drivers 606 are hardware specific code used to communicate between and operating system 608 and hardware peripherals such as a mouse 532, CD ROM drive or printer. Applications 610 are software application written in C/C++, Java, assembler or equivalent. Operating system 608 is the master program that loads after BIOS 604 initializes, that controls and runs the hardware 602. Examples of operating systems include DOS, Windows 3.1/95/98/NT, Unix, Macintosh, OS/2 and equivalent.

Figure 7:
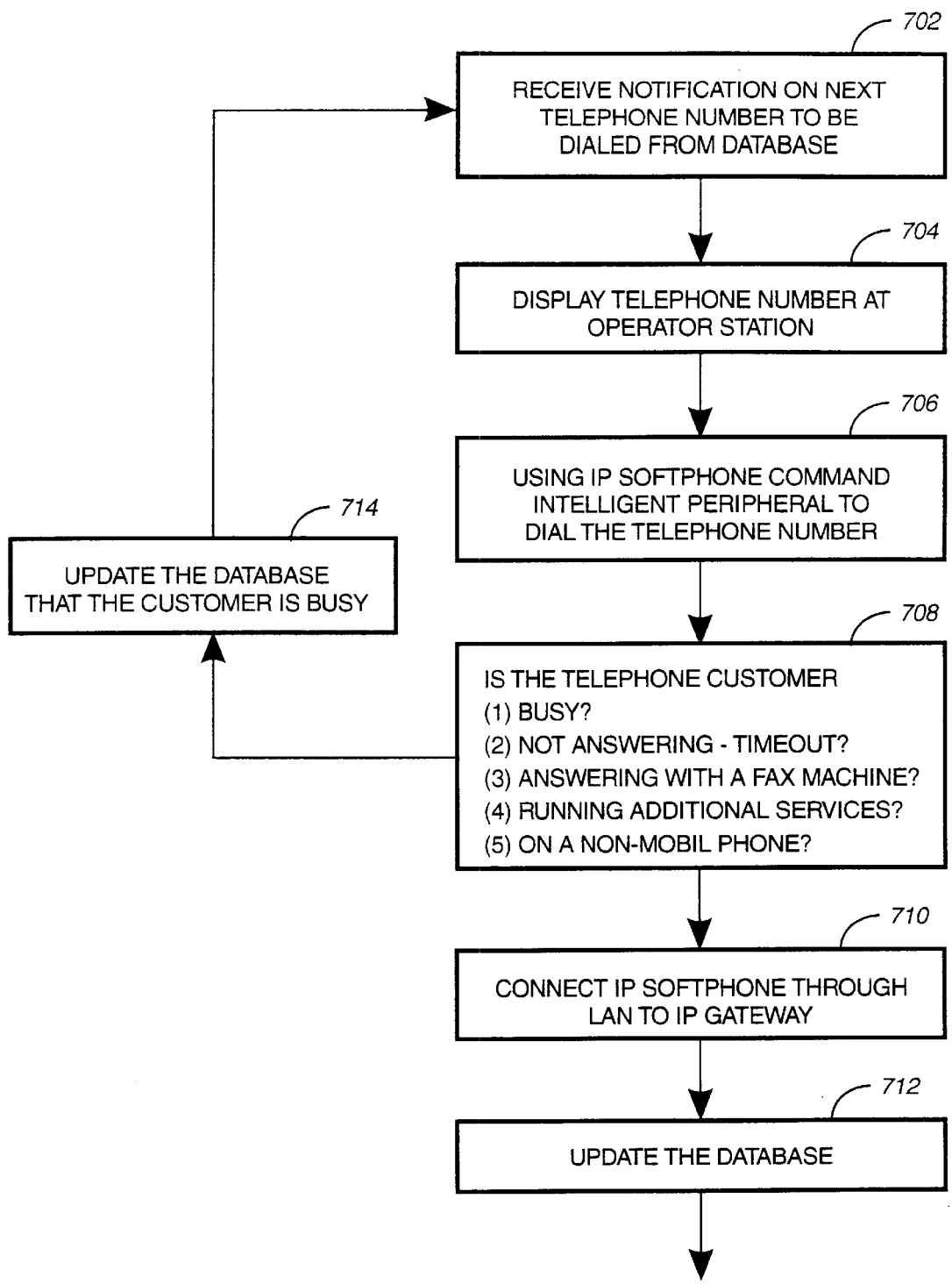
FIG. 7 is an application process flow of an application running on Intelligent Peripheral system of FIG. 4 according to the present invention.

FIG. 7 is an application process flow of an application running on Intelligent Peripheral system 305 of FIG.3 according to the present invention. It is important to note that the bulk calling telephony service is typically running in a client-server mode where the IP telephony gateway 218 is the server and the operator information processing systems 214 are the clients, however some of the services described for FIG. 7 below can be running as part of an application 610 on the operator information processing systems 214 as well. The process begins the an operator at operator station 214 receiving notification on the next telephone number to be dialed from database, step 702. This notification is displayed on the operator station, step 704. Using IP softphone commands to the intelligent peripheral to dial the telephone number on IP Telephony gateway 218, step 706. A determination is made at the IP telephone gateway 218 if the called customer 102 is: (1) busy; (2) not answering after a set time out; (3) answering with a fax machine; (4) running additional services such as call forwarding or find me; or (5) on a non-mobile phone, step 708. It should be noted that the last condition (5) is the customer on a non-mobile phone is performed in the embodiment where the AIN system 300 is internal to PSTN 104 as described above in FIG. 3. If any of the conditions in step 708 are true, the database 220 is updated to reflect the corresponding condition of step 708, e.g. the customer phone was busy and the process begins for the next customer in the database 220. If the customer is available and none of the conditions in step 708 apply, the call is completed and the database 220 is updated.

In another embodiment, the called party or customer 102 can be running on a IP telephony such as Microsoft's NetMeeting or equivalent. The SCP 303 is replaced by an equivalent function performed on a H.323 Gatekeeper. The H.323 Gatekeeper acts as the central point for all calls within its zone and provides call control services to registered endpoints. In many ways, an H.323 Gatekeeper acts as a virtual switch. More information on the H.323 Gatekeeper is available from DataBeam Corporation of Kentucky at online URL http://www.databeam.com/h323/h323primer.html.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A system for providing bulk calling over a public switched telephone network (PSTN) comprising:
    an Internet Protocol (IP) telephony gateway coupled to at least one point-to-point PSTN connection for bulk calling;
    a database connected to the gateway for providing telephone customer information including telephone number used for bulk calling;
    one or more client information processing units, each unit capable of being linked to at least one IP telephone;
    a bulk dialing application running on at least one client information processing unit for commanding the gateway to dial a number in the database to connect the IP telephone to a telephone subscriber whose number is dialed over the point-to-point PSTN connection; and
    a local area network connecting each of the client information processing units with the gateway so that the IP telephone connects to the gateway using voice over IP telephony and the gateway translates the voice over IP telephony to the point-to-point PSTN connection when connected using the bulk dialing application wherein the IP telephony gateway uses AIN architecture as an adjunct to the Service Control Point (SCP) inside the point-to-point PSTN connection.

2. The system for providing bulk calling in claim 1, wherein the gateway further comprising:
    a means for determining if the telephone subscriber called is available and updating the database with the status of the subscribe's availability.

3. The system for providing bulk calling in claim 2, wherein the means for determining if the telephone subscriber called is available, includes determining if the telephone subscriber's number dialed is busy.

4. The system for providing bulk calling in claim 2, wherein the means for determining if the telephone subscriber called is available, includes determining if the telephone subscriber's number dialed is forwarded.

5. The system for providing bulk calling in claim 2, wherein the means for determining if the telephone subscriber called is available, includes determining if the telephone subscriber's number dialed is not being answered.

6. The system for providing bulk calling in claim 1, further comprising:
    a connection from a subscriber to a point-to-point PSTN trunk on the IP telephony gateway.

7. A system for providing bulk calling over a public switched telephone network (PSTN) comprising:
    an Internet Protocol (IP) telephony gateway coupled to at least one point-to-point PSTN connection for bulk calling with one or more telephone subscribers coupled to the point-to-point PSTN connection; the gateway adapted to be coupled to a network for communicating with one or more operator units having IP telephony phones attached thereto;
    a database connected to the gateway for providing telephone customer information including telephone numbers used for bulk calling; and
    a bulk dialing application running on the gateway to dial a number in the database to connect at least one of the IP telephones to a telephone subscriber whose number is dialed over point-to-point PSTN connection so that the IP telephony phones connects to the gateway using voice over IP telephony on the network and the gateway translates the voice over IP telephony to the point-to-point PSTN connection when connected using the bulk dialing application wherein the IP telephony gateway uses AIN architecture as an adjunct to the Service Control Point (SCP) inside the point-to-point PSTN connection.

8. A method for providing bulk calling over a public switched telephone network (PSTN) comprising the steps of:
    coupling at least one point-to-point PSTN connection to an Internet Protocol (IP) telephony gateway for bulk calling;
    connecting a database to the gateway for providing telephone customer information including telephone numbers used for bulk calling;
    coupling a local area network to connect at least one client information processing unit to the gateway;
    running a bulk dialing application on at least one client information processing unit for commanding the gateway to dial a number in the database to connect the IP telephone to a telephone subscriber whose number is dialed over the point-to-point PSTN connection; and
    coupling at least one IP telephone to at least one client information processing unit so that the IP telephone connects to the gateway using voice over IP telephony and the gateway translates the voice over IP telephony to the point-to-point PSTN connection when connected using the bulk dialing application wherein the coupling of the IP telephony gateway includes coupling the IP telephony gateway which uses AIN architecture as an adjunct to the Service Control Point (SCP) inside the point-to-point PSTN connection.

9. The method according to claim 8, wherein the coupling of the IP telephony further comprising:
connecting a subscriber to a point-to-point PSTN trunk on the IP telephony gateway.

10. The method according to claim 8 wherein the step of running a bulk dialing application further comprises the step of:
determining if the telephone subscriber called is available and updating the database with the status of the subscriber's availability.

11. The method according to claim 10, wherein the step for determining if the telephone subscriber called is available, further comprises the step of:
determining if the telephone subscriber's number dialed is busy.

12. The method according to claim 10 wherein the step for determining if the telephone subscriber called is available, further comprises the step of:
determining if the telephone subscriber's number dialed is forwarded.

13. The method according to claim 10, wherein the step for determining if the telephone subscriber called is available, further comprises the step of:
determining if the telephone subscriber's number dialed is not being answered.

14. A computer readable storage medium containing program instructions for providing bulk calling over a public switched telephone network (PSTN), said program instructions comprising instructions for:
coupling at least one point-to-point PSTN connection to an Internet Protocol (IP) telephony gateway for bulk calling;
connecting a database to the gateway for providing telephone customer information including telephone numbers used for bulk calling;
coupling a local area network to connect at least one client information processing unit to the gateway;
running a bulk dialing application on at least one client information processing unit for commanding the gateway to dial a number in the database to connect the IP telephone to a telephone subscriber whose number is dialed over the point-to-point PSTN connection; and
coupling at least one IP telephone to at least one client information processing unit so that the IP telephone connects to the gateway using voice over IP telephony and the gateway translates the voice over IP telephony to the point-to-point PSTN connection when connected using the bulk dialing application wherein the instruction of coupling of the IP telephony gateway includes the IP telephony gateway which uses AIN architecture as an adjunct to the Service Control Point (SCP) inside the point-to-point PSTN connection.

15. The computer readable storage medium according to claim 5 wherein the instruction of running a bulk dialing application further comprises the instruction of:
determining if the telephone subscriber called is available and updating the database with the status of the subscriber's availability.

16. The computer readable storage medium according to claim 14, wherein the instruction of coupling of the IP telephony further comprising the instruction of:
connecting a subscriber to a point-to-point PSTN trunk on the IP telephony gateway.

17. The computer readable storage medium according to claim 16, further comprising the instructions of:
determining if the telephone subscriber's number dialed is busy.

18. The computer readable storage medium according to claim 16, further comprising the instruction of:
determining if the telephone subscriber's number dialed is forwarded.

19. The computer readable storage medium according to claim 16, further comprising the instruction of, wherein the instruction for determining if the telephone subscriber called is available, further comprises the instruction of:
determining if the telephone subscriber's number dialed is not being answered.

* * * * *